United States Patent
Wang et al.

(10) Patent No.: US 9,761,003 B2
(45) Date of Patent: Sep. 12, 2017

(54) STEREO IMAGE DEPTH MAP GENERATION DEVICE AND METHOD

(71) Applicant: DELTA ELECTRONICS, INC., Taoyuan (TW)

(72) Inventors: Te-Chih Wang, Taoyuan (TW); Hao-Wei Peng, Taoyuan (TW); Chun-Te Wu, Taoyuan (TW); Chen-Yuan Luo, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 29 days.

(21) Appl. No.: 15/144,841

(22) Filed: May 3, 2016

(65) Prior Publication Data

US 2017/0091946 A1    Mar. 30, 2017

(30) Foreign Application Priority Data

Sep. 25, 2015   (TW) .............................. 104131724 A

(51) Int. Cl.
G06T 7/00      (2017.01)
G06T 5/20      (2006.01)

(52) U.S. Cl.
CPC .............. *G06T 7/0075* (2013.01); *G06T 5/20* (2013.01); *G06T 2207/10012* (2013.01); *G06T 2207/20028* (2013.01)

(58) Field of Classification Search
CPC .................................. G06T 7/0075; G06T 5/20
See application file for complete search history.

(56) References Cited

U.S. PATENT DOCUMENTS 8,594,180 B2    11/2013  Yang et al.
9,361,677 B2 *   6/2016  Kauff ...................... G06T 5/002
(Continued)

FOREIGN PATENT DOCUMENTS

CN    101443817 B    6/2013
EP    2499829 A2     9/2012
(Continued)

OTHER PUBLICATIONS

Chen et al, "Real-time Edge-Aware Image Processing with the Bilateral Grid", 2007, ACM Transactions on Graphics (TOG) 26.3 (2007), 9 pages.*
(Continued)

*Primary Examiner* — David F Dunphy
(74) *Attorney, Agent, or Firm* — CKC & Partners Co., Ltd.

(57) ABSTRACT

A stereo image depth map generation device that includes a depth calculation module, a first order bilateral filter module and a second order bilateral filter module is provided. The depth calculation module receives a reference image including a plurality of reference pixels and a target image including a plurality of target pixels to generate an initial depth map according to pixel differences of the reference pixels and the target pixels. The first order bilateral filter module receives the initial depth map to perform a first order bilateral filtering calculation according to the initial depth map and the initial depth map itself to generate an averaged depth map. The second order bilateral filter module receives the averaged depth map and the target image to perform a second order bilateral filtering calculation according to the averaged depth map and the target image to generate a refined depth map.

18 Claims, 3 Drawing Sheets

(56) References Cited

U.S. PATENT DOCUMENTS

| | | | |
|---|---|---|---|
| 2008/0170800 A1* | 7/2008 | Bergman | G06K 9/40 382/275 |
| 2012/0195492 A1* | 8/2012 | Ali | G06T 3/4007 382/154 |
| 2014/0240310 A1* | 8/2014 | Guseva | G06T 19/20 345/419 |
| 2014/0285623 A1* | 9/2014 | Bruls | G06T 5/002 348/43 |

FOREIGN PATENT DOCUMENTS

| | | |
|---|---|---|
| TW | 201432622 A | 8/2014 |
| TW | 201505419 A | 2/2015 |
| TW | 201525939 A | 7/2015 |

OTHER PUBLICATIONS

Elad, "On the Origin of the Bilateral Filter and Ways to Improve It", 2002, IEEE Transactions on Image Processing, vol. 11, No. 10, pp. 1141-1151.*

Lenzen et al, "Denoising Strategies for Time-of-Flight Data", 2013, in Time-of-Flight and Depth Imaging Sensors, Algorithms, and Applications, 19 pages.*

Richardt et al, "Real-time Spatiotemporal Stereo Matching Using the Dual-Cross-Bilateral Grid", 2010, European conference on Computer vision, 14 pages.*

Schafer et al, "Depth and Intensity Based Edge Detection in Time-of-Flight Images", 2013, 3DTV-Conference, 2013 International Conference on. IEEE, 8 pages.*

Takeda et al, "Higher Order Bilateral Filters and Their Properties", 2007, Computational Imaging, 9 pages.*

S. Mattocia, Marco Viti, and Florian Ries,"Near real-time Fast Bilateral Stereo on the GPU,"Computer Vision and Pattern Recognition Workshops(CVPRW) 2011, p. 136-143.

K. Yoon and I. Kweon,"Adaptive support-weight approach for correspondence search,"IEEE Transactions on Pattern Analysis and Machine Intelligence, vol. 28, No. 4, Apr. 2006, pp. 650-656.

S. Mattoccia, S. Giardino, and A. Gambini,"Accurate and Efficient Cost Aggregation Strategy for Stereo Correspondence Based on Approximated Joint Bilateral Filtering,"Computer Vision-ACCV 2009, pp. 371-380.

S. Mattoccia, S. Giardino, and A. Gambini,"Near real-time Fast Bilateral Stereo on the GPU,"Computer Vision and Pattern Recognition Workshops(CVPRW) 2011, p. 136-143.

C. Richardt, D. Orr, I. Davies, A. Criminisi, and N. A. Dodgson,"Real-time spatiotemporal stereo matching using the dual-cross-bilateral grid,"In ECCV (3), pp. 510-523, 2010.

* cited by examiner

STEREO IMAGE DEPTH MAP GENERATION DEVICE AND METHOD

RELATED APPLICATIONS

This application claims priority to Taiwan Application Serial Number 104131724, filed Sep. 25, 2015, which is herein incorporated by reference.

BACKGROUND

Field of Invention

The present invention relates to a stereo image processing technology. More particularly, the present invention relates to a stereo image depth map generation device and method of the same.

Description of Related Art

Stereo vision technologies are widely adapted in various fields such as the three dimensional movies, in which a depth map is an important information to generate the stereo vision. The depth map can be generated by stereo matching. The accuracy of the stereo matching greatly affects the quality of the image. However, in current technologies, the quality of the depth map is limited due to the fragmented part and the edge dilation condition of the disparity that results in a shaking condition when the three dimensional image generated according to the depth map is viewed by the user.

Accordingly, what is needed is a stereo image depth map generation device and method to address the above issues.

SUMMARY

An aspect of the present invention is to provide a stereo image depth map generation device. The stereo image depth map generation device includes a depth calculation module, a first order bilateral filter module and a second order bilateral filter module is provided. The depth calculation module receives a reference image including a plurality of reference pixels and a target image including a plurality of target pixels to generate an initial depth map according to pixel differences of the reference pixels and the target pixels. The first order bilateral filter module receives the initial depth map to perform a first order bilateral filtering calculation according to the initial depth map and the initial depth map itself to generate an averaged depth map. The second order bilateral filter module receives the averaged depth map and the target image to perform a second order bilateral filtering calculation according to the averaged depth map and the target image to generate a refined depth map.

Another aspect of the present invention is to provide a stereo image depth map generation method. The stereo image depth map generation method includes the steps outlined below. A reference image including a plurality of reference pixels and a target image including a plurality of target pixels are received by a depth calculation module to generate an initial depth map according to pixel differences of the reference pixels and the target pixels. The initial depth map is received by a first order bilateral filter module to perform a first order bilateral filtering calculation according to the initial depth map and the initial depth map itself to generate an averaged depth map. The averaged depth map and the target image are received by a second order bilateral filter module to perform a second order bilateral filtering calculation according to the averaged depth map and the target image to generate a refined depth map.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
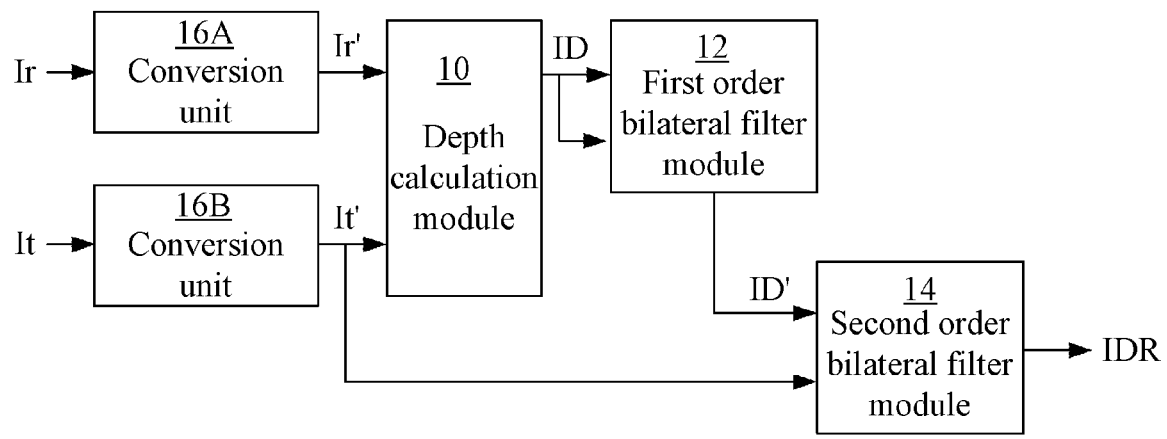
FIG. 1 is a block diagram of a software test system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is now made to FIG. 1. FIG. 1 is a block diagram of a stereo image depth map generation device 1 in an embodiment of the present invention. The stereo image depth map generation device 1 includes a depth calculation module 10, a first order bilateral filter module 12 and a second order bilateral filter module 14.

The depth calculation module 10 receives a reference image Ir and a target image It. Both the reference image Ir and the target image It are two dimensional images. In an embodiment, the reference image Ir is a right image viewed by the right eye and the target image It is a left image viewed by the left eye. In another embodiment, the reference image Ir is the left image viewed by the left eye and the target image It is the right image viewed by the right eye. The reference image Ir includes a plurality of reference pixels (not illustrated) and the target image It includes a plurality of target pixels (not illustrated).

In an embodiment, the stereo image depth map generation device 1 further includes two conversion units 16A and 16B to respectively convert the reference image Ir and the target image It from a RGB color space to a YcbCr color space such that the depth calculation module 10 receives and processes the converted reference image Ir' and the target image It'.

The depth calculation module 10 generates an initial depth map ID according to pixel differences of the reference pixels of the reference image Ir' and the target pixels of the target image It'.

The first order bilateral filter module 12 receives the initial depth map ID to perform a first order bilateral filtering calculation according to the initial depth map ID and the initial depth map ID itself to generate an averaged depth map ID'.

In an embodiment, the first order bilateral filtering calculation performed by the first order bilateral filter module 12 is a bilateral grid filtering calculation. The bilateral grid filtering technology is derived from the basic bilateral filtering technology.

The bilateral filtering technology is a non-linear filtering technology that is able to blur the image while the information of the edges of the image can be preserved. The bilateral grid filtering technology further improves the calculation efficiency to map the two dimensional image to a three dimensional space. By controlling the size of the grid, a bilateral filtering process is performed on the pixels mapped to the three dimensional space and the values generated after the filtering process are mapped to the original image to obtain a smooth image. In an embodiment, the first order bilateral filter module 12 performed on the initial depth map ID and the initial depth map ID itself can use weightings of the pixel distance and the pixel color difference such that the disparity information included in the initial depth map ID becomes smooth to improve the issue of the fragmented disparity information.

The second order bilateral filter module 14 receives the averaged depth map ID' and the target image It to perform a second order bilateral filtering calculation according to the averaged depth map ID' and the target image It to generate a refined depth map IDR.

Similarly, in an embodiment, the second order bilateral filtering calculation performed by the second order bilateral filter module 14 is a bilateral grid filtering calculation. The second order bilateral filtering calculation uses the target image It' that is two dimensional to improve the issue of dilation of edges of the disparity information in the initial depth map ID.

Accordingly, the stereo image depth map generation device 1 performs further refinement on the depth map by using the two stages of bilateral filter modules to improve the quality of the depth map.

Figure 2:
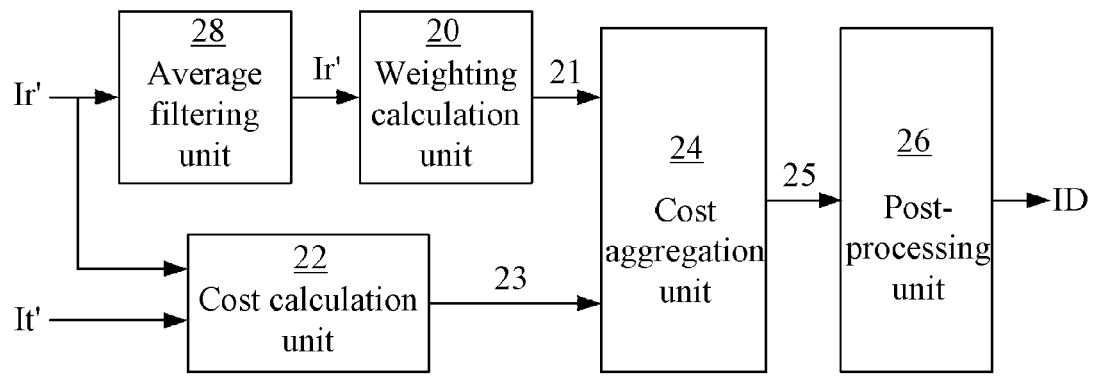
FIG. 2 is a detailed block diagram of the depth calculation module 10 in an embodiment of the present invention.

Reference is now made to FIG. 2. FIG. 2 is a detailed block diagram of the depth calculation module 10 in an embodiment of the present invention. The depth calculation module 10 includes a weighting calculation unit 20, a cost calculation unit 22, a cost aggregation unit 24 and a post-processing unit 26.

In an embodiment, the depth calculation module 10 further includes an average filtering unit 28 to process the reference image Ir' after performing an average filtering process thereon such that the weighting calculation unit 20 receives and processes the averaged reference image Ir'. In an embodiment, the average filtering process is performed with a window size of such as, but not limited to three times three to filter the noise of the reference image Ir'.

The weighting calculation unit 20 is configured to determine a difference value range that each of a plurality of parameter difference values between the reference pixels locates and further assign a weighting value 21 corresponding to the difference value range to each of the reference pixels. Each of the parameter difference values is a color parameter difference value or a spatial parameter difference value. For example, the color parameter difference value is the difference of the gray level values between pixels. The spatial parameter difference value is the difference of the pixel distance between pixels. In an embodiment, the difference value range mentioned above and the weighting value 21 correspond to each other with a binary number relation.

Figure 3:
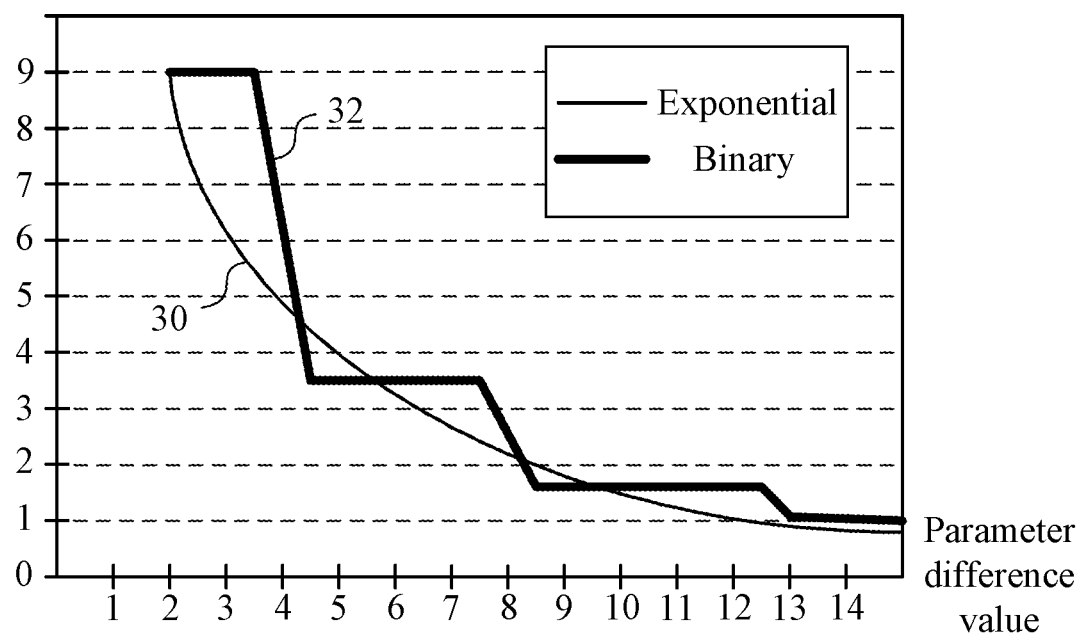
FIG. 3 is a diagram of a curve of the corresponding relation between the difference value range and the weighting value in an embodiment of the present invention.

Reference is now made to FIG. 3. FIG. 3 is a diagram of a curve of the corresponding relation between the difference value range and the weighting value 21 in an embodiment of the present invention. The x-axis is the parameter difference value and the y-axis is the weighting value 21.

In some technologies, the corresponding relation between the difference value ranges and the weighting value 21 is a thinner exponential curve 30 as illustrated in FIG. 3. The advantage of using exponential relation to generate the weighting values is that the sensitivity to the weighting values is higher. However, each value within the reference window of each of the pixels needs to be calculated such that the calculation overhead becomes large.

The thicker curve 32 that represents the binary corresponding relation is to set one weighting value to each of the difference value ranges. Different from the point to point relation of the exponential relation, the binary corresponding relation assigns the weighting values by using a line to point relation to greatly decrease the calculation overhead. Further, the error caused by some noises can be neglect as well.

The cost calculation unit 22 is configured to calculate cost values 23 of the reference pixels of the reference image Ir' and the target pixels of the target image It' according to a window matching process and a predetermined search range.

In an embodiment, each of the cost values 23 calculated by the cost calculation unit 22 is a truncated absolute difference of one of the reference pixels and one of the target pixels. More specifically, the difference values between the pixels are truncated by a predetermined threshold to obtain the absolute values therefrom in order to decrease the impact of the noise. In an embodiment, the number of the cost values 23 is determined by the size of the search range. When the size of the search range is larger, more times of the calculation of the cost need to be taken.

The cost aggregation unit 24 is configured to perform the cost aggregation calculation according to the weighting value 21 and the cost values 23 to generate a plurality groups of cost aggregated values 25 corresponding to a plurality of depth pixels of the initial depth map ID. In an embodiment, the cost aggregation unit 24 collects statistics based on the values within the reference window to calculate the sum of the pixel difference values according to the weighting value 21 and the cost values 23. In different embodiments, the cost aggregation unit 24 either multiplies the weighting value 21 and the cost values 23 corresponding to the reference window and sums the result values, or performs aggregation separately along the horizontal and vertical directions. Each group of the cost aggregated values 25 includes a maximum cost aggregated value and a minimum cost aggregated value.

The post-processing unit 26 is configured to receive the groups of cost aggregated values 25. The post-processing unit 26 not only finds out the minimum cost aggregated value, but also calculates a ratio between the maximum cost aggregated value and the minimum cost aggregated value. When the ratio is larger than a threshold, the post-processing unit 26 determines that the minimum cost aggregated value is reliable. When the ratio is smaller than the threshold, the post-processing unit 26 determines that the minimum cost aggregated value is unreliable. By using the method mentioned above, the post-processing unit 26 obtains the distribution of a reliable mask. In an embodiment, the post-processing unit 26 generates an amended cost aggregated value for each of the unreliable pixels. The amended cost aggregated value can be generated by averaging the parameters of the neighboring pixels or by other methods.

The post-processing unit 26 is further configured to outputs the reliable minimum cost aggregated value and the amended cost aggregated value corresponding to all the depth pixels to generate the initial depth map ID. After the generation of the reliable mask, the initial depth map ID can be refined such that the accuracy of the initial depth map ID is increased.

Accordingly, the depth calculation module 10 can use the binary corresponding relation of the weighting values and the generation of the reliable mask to accomplish the increase of the calculation speed and the refinement of the initial depth map ID.

Figure 4:
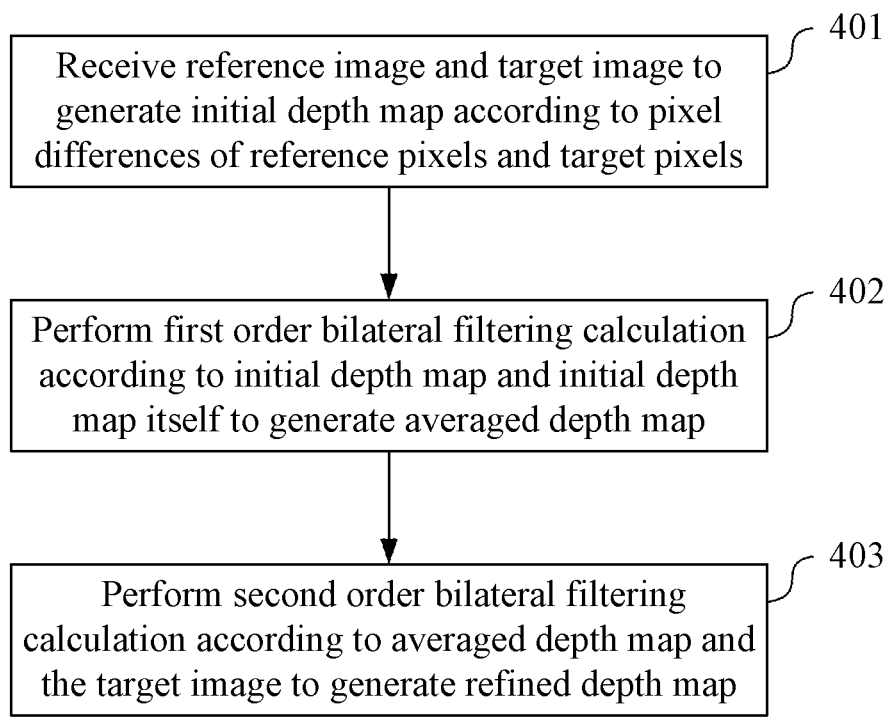
FIG. 4 is a flow chart of a stereo image depth map generation method in an embodiment of the present invention.

Reference is now made to FIG. 4. FIG. 4 is a flow chart of a stereo image depth map generation method 400 in an embodiment of the present invention. The stereo image depth map generation method 400 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 401, the reference image Ir and the target image It are received by the depth calculation module 10 to generate the initial depth map ID according to pixel differences of the reference pixels and the target pixels.

In step 402, the initial depth map ID is received by the first order bilateral filter module 12 to perform the first order bilateral filtering calculation according to the initial depth map ID and the initial depth map ID itself to generate the averaged depth map ID'.

In step 403, the averaged depth map ID' and the target image It are received by the second order bilateral filter module 14 to perform the second order bilateral filtering calculation according to the averaged depth map ID' and the target image It to generate a refined depth map IDR.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A stereo image depth map generation device comprising:
   a depth calculation module configured to receive a reference image comprising a plurality of reference pixels and a target image comprising a plurality of target pixels to generate an initial depth map according to pixel differences of the reference pixels and the target pixels;
   a first order bilateral filter module configured to receive the initial depth map to perform a first order bilateral filtering calculation according to the initial depth map and the initial depth map itself to generate an averaged depth map; and
   a second order bilateral filter module configured to receive the averaged depth map and the target image to perform a second order bilateral filtering calculation according to the averaged depth map and the target image to generate a refined depth map.

2. The stereo image depth map generation device of claim 1, wherein each of the first order bilateral filtering calculation and the second order bilateral filtering calculation is a bilateral grid filtering calculation.

3. The stereo image depth map generation device of claim 1, wherein the depth calculation module comprises:
   a cost aggregation unit configured to perform a cost aggregation calculation according to a plurality cost values between the reference pixels and target pixels to generate a plurality groups of cost aggregated values corresponding to a plurality of depth pixels of the initial depth map, wherein one of the group of the cost aggregated values comprise a maximum cost aggregated value and a minimum cost aggregated value; and
   a post-processing unit configured to calculate a ratio between the maximum cost aggregated value and the minimum cost aggregated value to determine that the minimum cost aggregated value is reliable when the ratio is larger than a threshold and to determine that the minimum cost aggregated value is unreliable when the ratio is smaller than the threshold so as to generate an amended cost aggregated value;
   wherein the post-processing unit is further configured to outputs the reliable minimum cost aggregated value and the amended cost aggregated value corresponding to all the depth pixels to generate the initial depth map.

4. The stereo image depth map generation device of claim 3, wherein the depth calculation module comprises:
   a weighting calculation unit configured to determine a plurality of parameter difference values between the reference pixels are within a difference value range so as to assign a weighting value corresponding to the difference value range to each of the reference pixels; and
   a cost calculation unit configured to calculate the cost values of the reference pixels and the target pixels according to a window matching process and a predetermined search range;
   wherein the cost aggregation unit is configured to perform the cost aggregation calculation according to the weighting value corresponding to each of the reference pixels and the cost values.

5. The stereo image depth map generation device of claim 4, wherein each of the cost values is a truncated absolute difference of one of the reference pixels and one of the target pixels.

6. The stereo image depth map generation device of claim 4, wherein the difference value range and the weighting value correspond to each other with a binary number relation.

7. The stereo image depth map generation device of claim 4, wherein each of the parameter difference values is a color parameter difference value or a spatial parameter difference value.

8. The stereo image depth map generation device of claim 1, further comprising two conversion units to respectively convert the reference image and the target image from a RGB color space to a YcbCr color space such that the depth calculation module processes the converted reference image and the target image.

9. The stereo image depth map generation device of claim 1, wherein the depth calculation module further comprises an average filtering unit to process the reference image after performing an average filtering process thereon.

10. A stereo image depth map generation method comprising:
    receiving a reference image comprising a plurality of reference pixels and a target image comprising a plurality of target pixels by a depth calculation module to generate an initial depth map according to pixel differences of the reference pixels and the target pixels;

receiving the initial depth map by a first order bilateral filter module to perform a first order bilateral filtering calculation according to the initial depth map and the initial depth map itself to generate an averaged depth map; and receiving the averaged depth map and the target image by a second order bilateral filter module to perform a second order bilateral filtering calculation according to the averaged depth map and the target image to generate a refined depth map.

11. The stereo image depth map generation method of claim 10, wherein each of the first order bilateral filtering calculation and the second order bilateral filtering calculation is a bilateral grid filtering calculation.

12. The stereo image depth map generation method of claim 10, further comprising:

performing a cost aggregation calculation by a cost aggregation unit of the depth calculation module according to a plurality cost values between the reference pixels and target pixels to generate a plurality groups of cost aggregated values corresponding to a plurality of depth pixels of the initial depth map, wherein one of the group of the cost aggregated values comprise a maximum cost aggregated value and a minimum cost aggregated value;

calculating a ratio between the maximum cost aggregated value and the minimum cost aggregated value by a post-processing unit of the depth calculation module to determine that the minimum cost aggregated value is reliable when the ratio is larger than a threshold and to determine that the minimum cost aggregated value is unreliable when the ratio is smaller than the threshold so as to generate an amended cost aggregated value; and outputting the reliable minimum cost aggregated value and the amended cost aggregated value corresponding to all the depth pixels by the post-processing unit to generate the initial depth map.

13. The stereo image depth map generation method of claim 12, wherein the depth calculation module comprises:

determining a plurality of parameter difference values between the reference pixels are within a difference value range by a weighting calculation unit of the depth calculation module so as to assign a weighting value corresponding to the difference value range to each of the reference pixels;

calculating the cost values of the reference pixels and the target pixels by a cost calculation unit of the depth calculation module according to a window matching process and a predetermined search range; and performing the cost aggregation calculation by the cost aggregation unit according to the weighting value corresponding to each of the reference pixels and the cost values.

14. The stereo image depth map generation method of claim 13, wherein each of the cost values is a truncated absolute difference of one of the reference pixels and one of the target pixels.

15. The stereo image depth map generation method of claim 13, wherein the difference value range and the weighting value correspond to each other with a binary number relation.

16. The stereo image depth map generation method of claim 13, wherein each of the parameter difference values is a color parameter difference value or a spatial parameter difference value.

17. The stereo image depth map generation method of claim 10, further comprising:

respectively converting the reference image and the target image by two conversion units from a RGB color space to a YcbCr color space such that the depth calculation module processes the converted reference image and the target image.

18. The stereo image depth map generation method of claim 10, further comprising:

processing the reference image by the depth calculation module after performing an average filtering process on the reference image by an average filtering unit comprised by the depth calculation module.

* * * * *